(12) United States Patent
Yan et al.

(10) Patent No.: US 12,264,764 B2
(45) Date of Patent: Apr. 1, 2025

(54) QUICK-CONNECT DEVICE

(71) Applicant: Xiamen Forbetter Sanitary Ware CO., Ltd, Xiamen (CN)

(72) Inventors: Xiliang Yan, Xiamen (CN); Mouyong Lin, Xiamen (CN)

(73) Assignee: Xiamen Forbetter Sanitary Ware CO., Ltd, Xiamen (CN)

( * ) Notice: Subject to any disclaimer, the term of this patent is extended or adjusted under 35 U.S.C. 154(b) by 0 days.

(21) Appl. No.: 18/307,848

(22) Filed: Apr. 27, 2023

(65) Prior Publication Data
US 2024/0093817 A1    Mar. 21, 2024

(30) Foreign Application Priority Data

Mar. 17, 2023   (CN) .......................... 202310265046.5

(51) Int. Cl.
*F16L 37/10*    (2006.01)
*E03C 1/04*     (2006.01)

(52) U.S. Cl.
CPC ............ *F16L 37/10* (2013.01); *E03C 1/0401* (2013.01); *E03C 1/0402* (2013.01)

(58) Field of Classification Search
CPC ......... F16L 37/10; F16L 37/22; F16L 37/107; F16L 37/086; E03C 1/0402; E03C 1/0401; E03C 1/021; E03C 1/0403
See application file for complete search history.

(56) References Cited

U.S. PATENT DOCUMENTS 10,428,496 B1 *  10/2019  Lu .......................... E03C 1/0403
12,024,864 B2 *  7/2024   Wang .................... E03C 1/0401

FOREIGN PATENT DOCUMENTS

| CN | 211599237 U | 9/2020 | |
| CN | 217177759 U | 8/2022 | |
| DE | 102012007670 A1 * | 10/2013 | ............ F16L 37/086 |

OTHER PUBLICATIONS

Chen Y., CN-111005925-A, Apr. 14, 2020.*
Huang G., CN-205559500-U, Sep. 7, 2016.*
Lin M., CN-216199707-U, Apr. 5, 2022.*

* cited by examiner

*Primary Examiner* — Zachary T Dragicevich
*Assistant Examiner* — James A Linford

(57) ABSTRACT

A quick-connect device includes a sleeve and a connecting piece. The sleeve has an axial through hole, and includes a body having an inner peripheral wall. The connecting piece includes at least two connecting sheets that are circumferentially rotatably disposed in the inner peripheral wall of the body relative to the body of the sleeve, enclose a connecting hole, and are provided with threads on sides close to an axial centerline of the connecting hole. A driving structure capable of driving each of the connecting sheets to radially move toward the axial centerline of the connecting hole when the connecting sheet circumferentially rotates relative to the sleeve is located between the connecting sheet and the inner peripheral wall of the body.

10 Claims, 16 Drawing Sheets

QUICK-CONNECT DEVICE

CROSS-REFERENCE TO RELATED APPLICATIONS

This application claims the benefit of priority from Chinese Patent Application No. 202310265046.5, filed on Mar. 17, 2023. The content of the aforementioned application, including any intervening amendments thereto, is incorporated herein by reference in its entirety.

TECHNICAL FIELD

The present disclosure relates to the technical field of bathing equipment, in particular to a quick-connect device.

BACKGROUND

An inflow pipeline or a drainage pipeline of the bathing equipment such as a water faucet, a water inlet valve, or a wash basin is usually equipped with a nut component for fixing. For example, when the drainage pipeline of the water faucet is assembled, external threads are provided on a threaded pipe for installation and fixation of the water faucet, and then the nut component is screwed on the threaded pipe for installation and fixation of the water faucet to fix the water faucet on a mounting panel.

The Chinese patent with publication No. CN217177759U discloses a quick-assembly nut component. At the beginning of installation, an engagement surface of an elastic threaded body is not pressed by a pressing surface, the threads cannot be engaged with a threaded pipe tightly, so that the entire nut component can quickly pass through the threaded pipe to reach a predetermined position, and then, the quick-assembly nut component can be tightly screwed onto the threaded pipe by applying a force to the engagement surface by the pressing surface to enable the threads of the elastic threaded body to be engaged with the external threads of the threaded pipe at the predetermined position. For the quick-assembly nut component, the pressing surface of a pressing plate presses against the engagement surface of the elastic threaded body by the axial movement of the pressing plate, such that the elastic threaded body is driven to radially moves and to be tightened so as to be engaged with the external threads of the threaded pipe. That is, the elastic threaded body radially moves using a bevel-to-bevel press fit in an axis direction, and there will be clearance in the axis direction when the faucet is loosened, resulting in failure due to loosening of the overall internal structure of the entire assembled nut component.

The Chinese patent with publication No. CN211599237U discloses an assembly part. When the assembly part and a threaded rod are in threaded connection for assembly, the threaded rod is accommodated in a central through hole of a sleeve. When fasteners are pushed by a mounting panel, the fasteners draw close to each other to compress an elastic part, and axially move relative to the sleeve, such that the internal threads of the fasteners are meshed with the threaded rod to implement a quick installation and fixation. The assembly part is in press fit with second inclined surfaces of the fasteners by a first inclined surface of the sleeve. When suffering from a force, the fasteners may axially move relative to the sleeve, and meanwhile radially move to draw close to each other. That is, the elastic threaded body radially moves using a bevel-to-bevel press fit in an axis direction, and there will be clearance in the axial direction when the faucet is loosened, resulting in failure due to loosening of the overall internal structure of the entire assembled nut component. On the other hand, since there are two fasteners, when the mounting panel abutting against the fasteners has an uneven phenomenon, the mounting panel does not push the two fasteners at the same time, but pushes one of the fasteners first, so that one of the fasteners radially moves toward the central axis of the central through hole of the sleeve first, while the other fastener does not move, so that the threaded connection with the threaded rod is not available, and the fixation effect cannot be achieved.

SUMMARY

The present disclosure aims to solve one of the technical problems in the above-mentioned technology at least to some extent. To this end, an objective of the present disclosure is to provide a quick-connect device that is applied to an uneven mounting panel, and is less prone to fixation failure due to loosening in an axial direction.

In order to achieve the above objective, in a first aspect, an embodiment of the present disclosure provides a quick-connect device, including:

a sleeve, having an axial through hole, and including a body having an inner peripheral wall;

a connecting piece, including at least two connecting sheets, wherein the connecting sheets can circumferentially rotatably disposed in the inner peripheral wall of the body relative to the body of the sleeve, the connecting sheets enclose a connecting hole, the connecting sheets are provided with threads on sides close to an axial centerline of the connecting hole, and a driving structure capable of driving each of the connecting sheet to radially move toward the axial centerline of the connecting hole when the connecting sheet circumferentially rotates relative to the sleeve is located between the connecting sheet and the inner peripheral wall of the body.

In accordance with the quick-connect device in the embodiment of the present disclosure, the connecting sheets can circumferentially rotate relative to the body of the sleeve, and the driving structure is located between the connecting sheets and the inner peripheral wall of the body, and drives the connecting sheets radially move toward the axial centerline of the connecting hole when the connecting sheets circumferentially move relative to the body of the sleeve. When the quick-connect device is installed, the sleeve and connecting piece pass through a threaded pipe to reach a predetermined position, and a mounting panel or other mounting components abut against the connecting sheets. The sleeve is rotated, and the driving structure drives the connecting sheets to radially move toward the axial centerline of the connecting hole to narrow the connecting hole, thereby connecting the connecting sheets to the threaded pipe and quickly fixing the quick-connect device to the threaded pipe. Compared with prior art in which the connecting sheets are connected to the threaded pipe by transforming the axial movement into the radial movement of the connecting sheets, the present disclosure has the features that the connecting sheets are driven directly by the driving structure to radially move toward the axial centerline of the connecting hole, without transforming the axial movement into the radial movement of the connecting sheets. Therefore, although at least two connecting sheets are provided, it will not affect that the connecting sheets radially move toward the axial centerline of the connecting hole to be connected with the thread pipe even if the mounting panel or other mounting components have an uneven phenomenon since the connecting sheets do not move in an axial direction but only move in a radial direction. On the other hand, there is no clearance in the axis direction of the quick-connect device even if the threaded pipe loosens, which does not result in failure due to loosening of the internal structure of the quick-connect device. Thus, the present disclosure may be applied to uneven mounting panels, and meanwhile, is less prone to fixation failure due to loosening in the axial direction.

In addition, the quick-connect device provided according to the above embodiment of the present disclosure may have additional technical features as follows.

Optionally, an elastic part is connected between the adjacent connecting sheets.

Specifically, the elastic part is a plunger spring, and end parts of the connecting sheets are provided with projections in a circumferential direction respectively. One side of the plunger spring is clamped into the projection of one of the connecting sheets, and the other side of the plunger spring is clamped into the projection of the other one of the connecting sheets.

Optionally, the driving structure includes a bulge disposed on the inner peripheral wall of the body of the sleeve in an axial direction and an inclined guide surface disposed on the connecting sheet in the circumferential direction. The inclined guide surface has a decreasing distance from the inner peripheral wall of the body of the sleeve from a starting point to an ending point. The bulge can relatively move in the circumferential direction on the inclined guide surface to drive the connecting sheet to radially move toward the axial centerline of the connecting hole.

Specifically, the connecting sheet has a top surface, and an inner side surface as well as an outer side surface adjacent to the top surface, wherein the inner side surface is provided with the threads, and the outer side surface is provided with the inclined guide surface in the circumferential direction.

Further, a friction pad is disposed on the top surface of each of the connecting sheets.

Specifically, a recess applied to limiting the bulge is disposed at the ending point of the inclined guide surface.

Optionally, the driving structure includes an inclined guide surface disposed on the inner peripheral wall of the body of the sleeve in the circumferential direction and a bulge disposed on the connecting sheet in the axial direction. The inclined guide surface has a decreasing distance from the connecting sheet from a starting point to an ending point. The connecting sheet can be driven to radially move toward the axial centerline of the connecting hole when the inclined guide surface moves relative to the bulge in the circumferential direction.

Specifically, the connecting sheet has a top surface, and an inner side surface as well as an outer side surface adjacent to the top surface, wherein the inner side surface is provided with the threads, and the outer side surface is provided with the bulge.

Optionally, the driving structure includes an inclined guide slot disposed in a bottom wall, adjacent to the inner peripheral wall, of the body of the sleeve in the circumferential direction, and a projection disposed on the connecting sheet in the axial direction. The inclined guide slot has a decreasing distance from the inner peripheral wall of the body of the sleeve from a starting point to an ending point. The connecting sheet can be driven to radially move toward the axial centerline of the connecting hole when the inclined guide slot moves relative to the projection in the circumferential direction.

Specifically, the connecting sheet has a top surface, a bottom surface opposite to the top surface, and an inner side surface adjacent to the top surface, wherein the inner side surface is provided with the threads, and the bottom surface is provided with the projection.

Optionally, the driving structure includes a projection disposed on a bottom wall, adjacent to the inner peripheral wall, of the body of the sleeve in the axial direction, and an inclined guide slot disposed in the connecting sheet in the circumferential direction. The inclined guide slot has an increasing distance from the axial centerline of the connecting hole from a starting point to an ending point. The connecting sheet can be driven to radially move toward the axial centerline of the connecting hole when the projection moves relative to the inclined guide slot in the circumferential direction.

Specifically, the connecting sheet has a top surface, a bottom surface opposite to the top surface, and an inner side surface adjacent to the top surface, wherein the inner side surface is provided with the threads, and the bottom surface provided with the inclined guide slot.

Optionally, the driving structure includes an inclined guide slot and a projection. The connecting sheet has a top surface and an outer side surface adjacent to the top surface, and the outer side surface is provided with a first inclined surface on which the projection is radially disposed. The inner peripheral wall of the body of the sleeve is provided with a second inclined surface attached to the first inclined surface, and the second inclined surface is provided with the inclined guide slot that has a decreasing distance from the inner peripheral wall of the body of the sleeve from a starting point to an ending point. The connecting sheet can be driven to radially move toward the axial centerline of the connecting hole when the inclined guide slot moves relative to the projection in the circumferential direction.

Optionally, ribs are disposed on the inner peripheral wall of the body of the sleeve in the circumferential direction, and sliding slots applied to sliding of the ribs are disposed in the connecting sheets in the circumferential direction.

Optionally, a convex ring is disposed on the inner peripheral wall of the body of the sleeve in the circumferential direction.

Optionally, the sleeve further includes a handheld part connected to a side opposite to the side, at which the connecting sheets are disposed, of the body. Optionally, the connecting sheets are located on the same circumference to form a ring shape, and the connecting hole enclosed by the connecting sheets is a circular hole.

Figure 1:
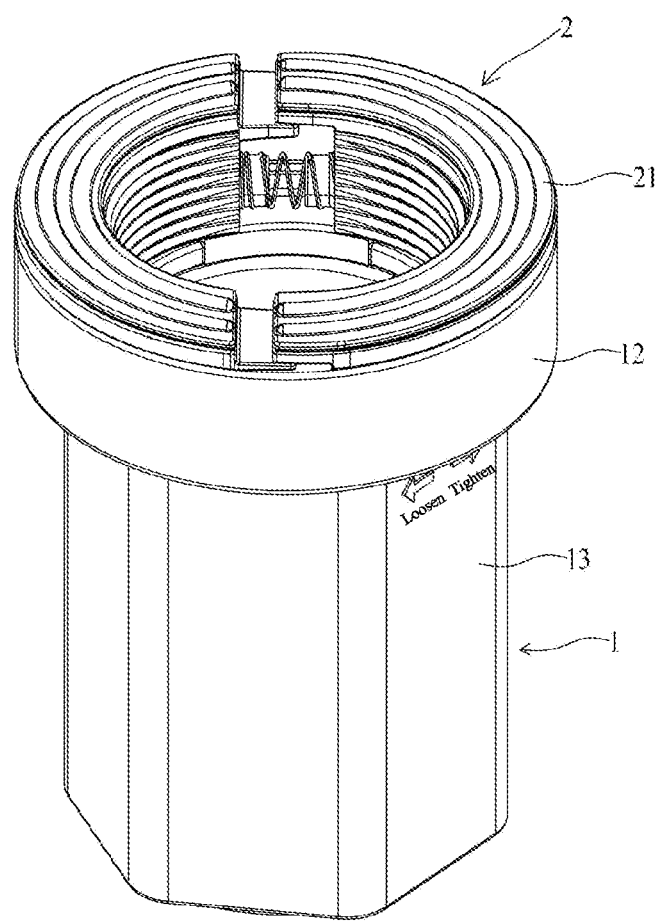
FIG. 1 is a stereoscopic constitutional diagram of Embodiment I of the present disclosure.

DESCRIPTION OF REFERENCE NUMERALS sleeve 1, axial through hole 11, body 12, inner peripheral wall 121, rib 122, convex ring 123, bottom wall 124, handheld part 13; connecting piece 2, the connecting sheet 21, top surface 211, inner side surface 212, outer side surface 213, projection 214, sliding slot 215, bottom surface 216, connecting hole 22, bulge 31, inclined guide surface 32, recess 321, inclined guide slot 33, projection 34, first inclined surface 35, second inclined surface 36, friction pad 4, elastic part 5, threaded pipe 6.

DETAILED DESCRIPTION OF EMBODIMENTS

Embodiments of the present disclosure will be described in detail below, and examples of the embodiments are illustrated in the accompanying drawings, where the same or similar reference numerals indicate the same or similar elements or elements having the same or similar function throughout. The embodiments described below by referring to the accompanying drawings are exemplary, are intended to explain the present disclosure, and cannot be understood as limitations on the present disclosure.

In order to better understand the above technical solutions, exemplary embodiments of the present disclosure will be described in more detail below with reference to the accompanying drawings. Although the exemplary embodiments of the present disclosure are illustrated in the accompanying drawings, it should be understood that the present disclosure may be embodied in various forms and should not be limited to the embodiments set forth herein. On the contrary, these embodiments are provided so that the present disclosure can be understood more thoroughly, and will fully convey the scope of the present disclosure to those skilled in the art.

For better understanding the above technical solutions, the above technical solutions will be described in detail below in conjunction with the accompanying drawings and the specific embodiments of the present disclosure.

Embodiment I

As shown in FIGS. 1-8, a quick-connect device according to an embodiment of the present disclosure, applied to quick installation of an inflow pipeline or a drainage pipeline of bathing equipment, in particular, a water faucet, a water inlet valve, a wash basin, etc., includes a sleeve 1 and a connecting piece 2, where the connecting piece 2 and the sleeve 1 are detachably assembled together.

The sleeve 1 is provided with an axial through hole 11, and includes a body 12 having an inner peripheral wall 121, where the body 12 is in a ring shape. Optionally, the sleeve 1 further includes a handheld part 13 that is connected to a side opposite to the side, at which the connecting sheets are disposed, of the body. The handheld part 13 is set to be in a shape of cylindrical polygon, and of course, the handheld part 13 may be in other shapes, such as a cylindrical circular ring. Words "Loosen" and "Tighten" and arrows corresponding thereto are disposed on an outer side wall of the handheld part 13 to indicate the rotation direction of the sleeve 1. The sleeve 1 rotates in the direction of "Tighten" arrow when in assembly, and rotates in the direction of "Loosen" arrow when in disassembly.

Figure 2:
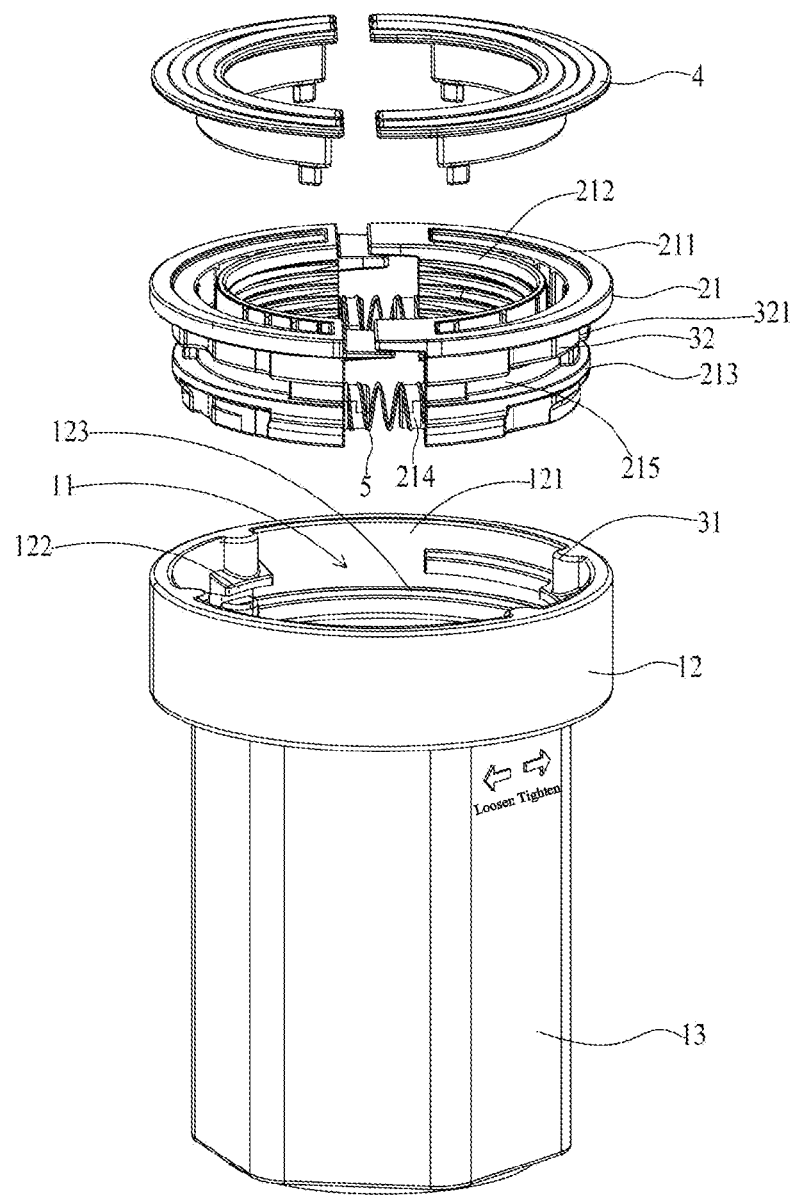
FIG. 2 is an exploded view of Embodiment I of the present disclosure.
Figure 3:
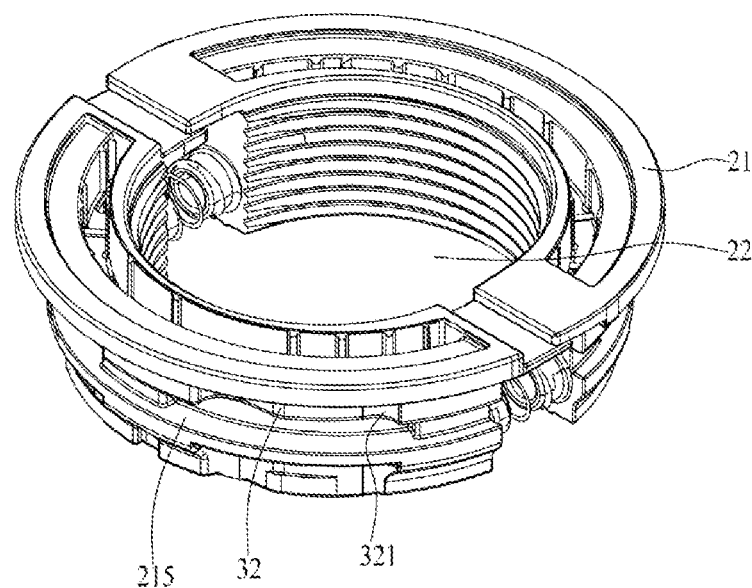
FIG. 3 is a schematic structural diagram of a connecting piece according to Embodiment I of the present disclosure.
Figure 4:
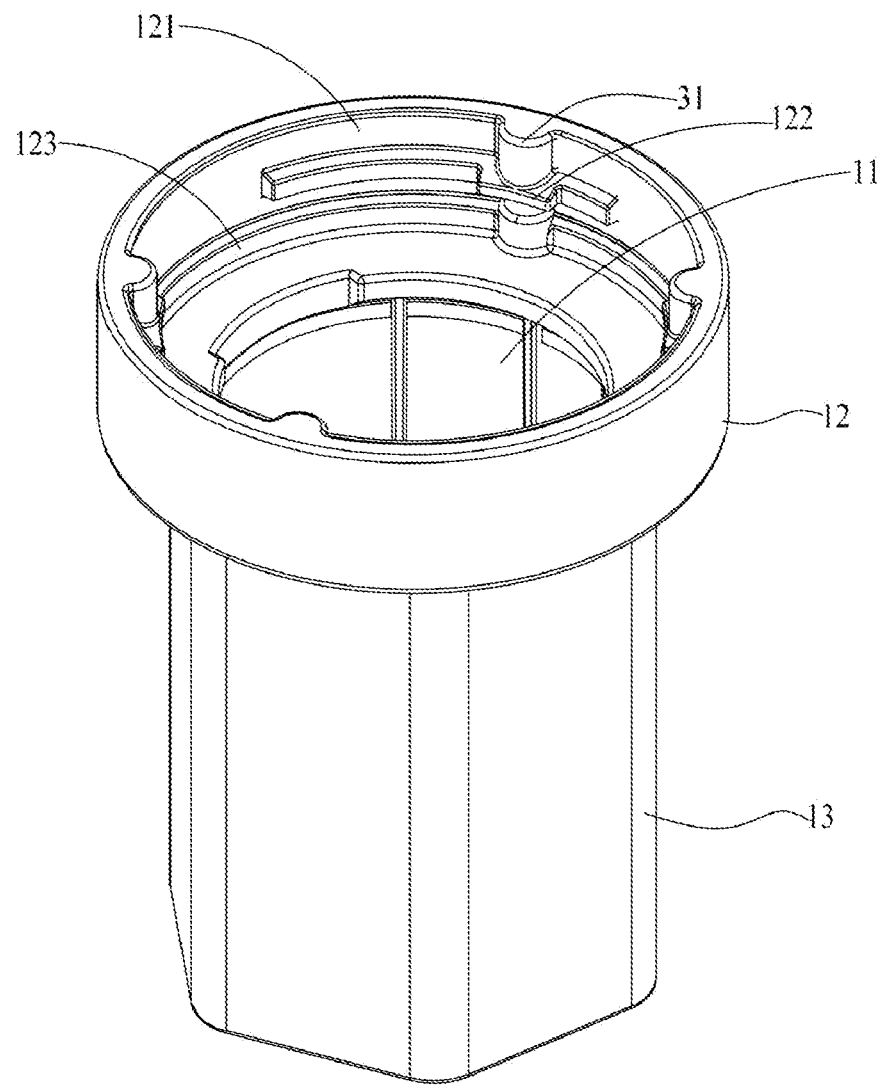
FIG. 4 is a schematic structural diagram of a sleeve according to Embodiment I of the present disclosure.
Figure 5:
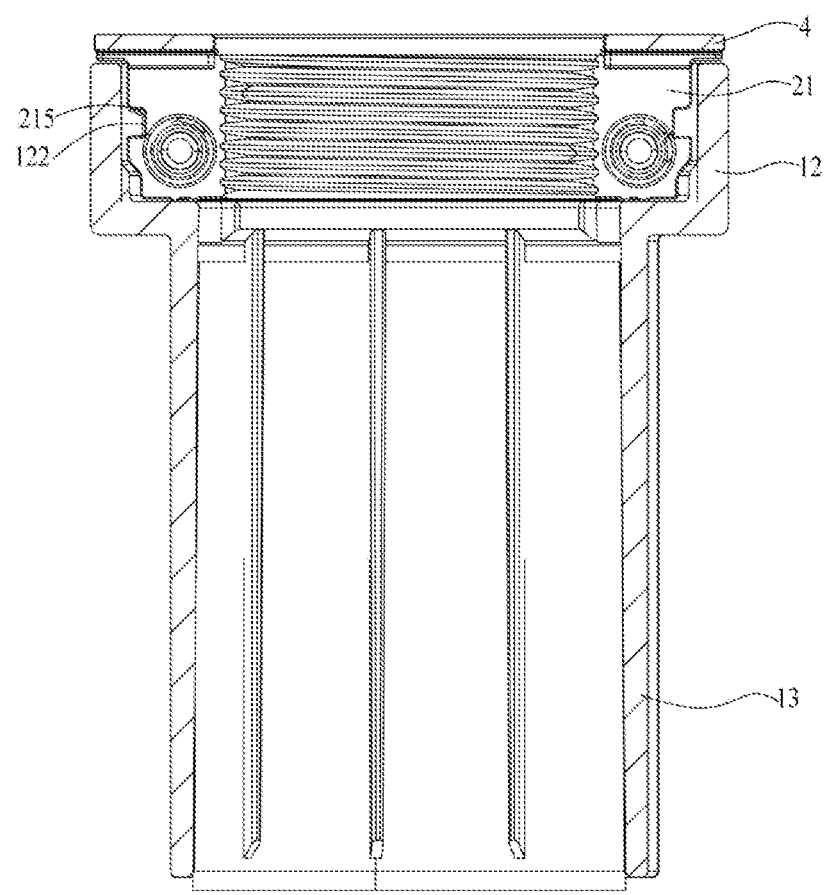
FIG. 5 is a longitudinal sectional view of Embodiment I of the present disclosure.
Figure 7:
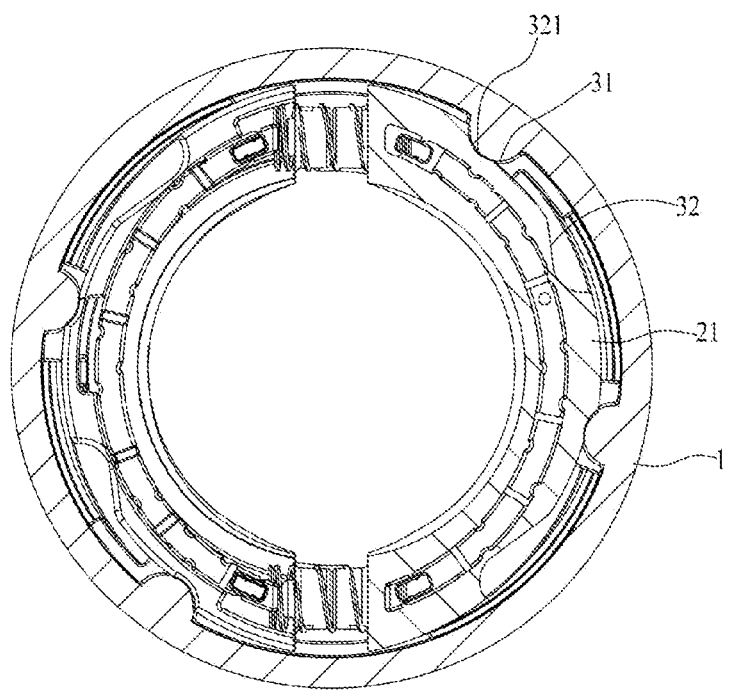
FIG. 7 is a transverse sectional view of Embodiment I of the present disclosure (connecting sheets getting close to an axial centerline of a connecting hole)
Figure 8:
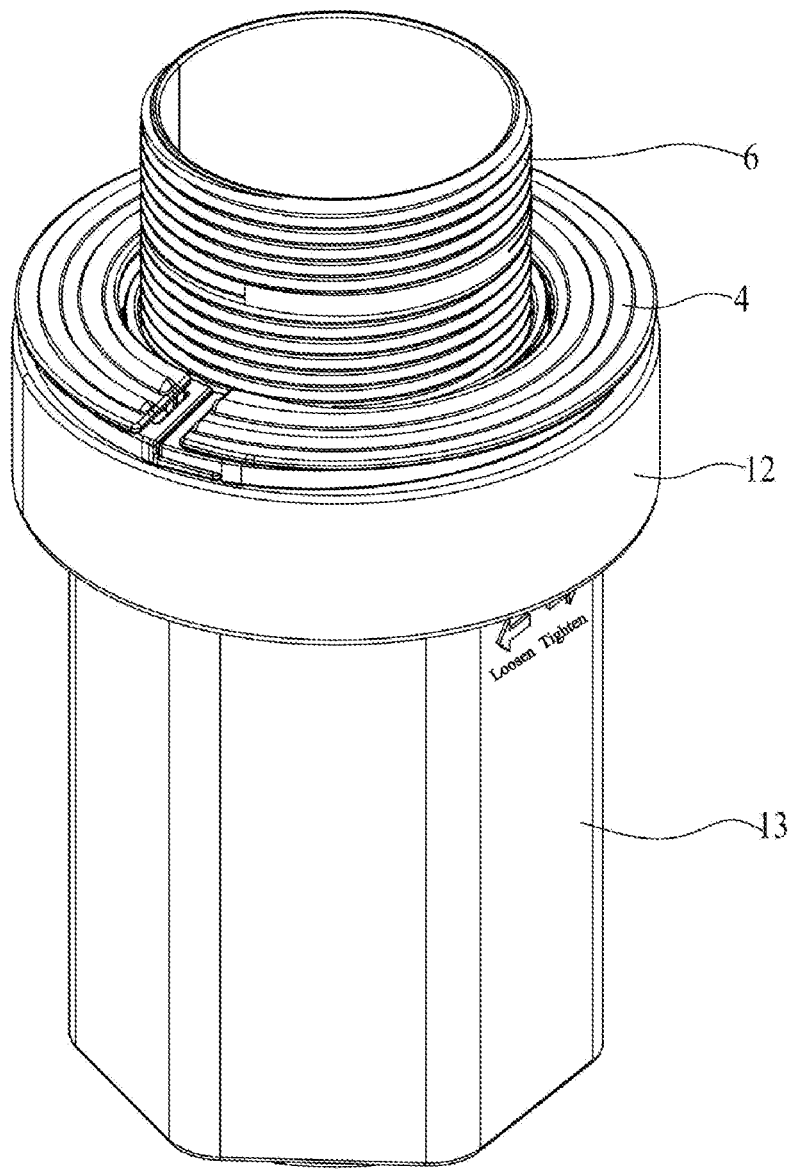
FIG. 8 is a schematic structural diagram showing connection with a threaded pipe according to Embodiment I of the present disclosure.

The connecting piece 2 includes at least two connecting sheets 21. As shown in FIG. 2, preferably, the connecting piece 2 includes two connecting sheets 21. The connecting sheets 21 are circumferentially rotatably disposed in the inner peripheral wall 121 of the body 12 relative to the body 12 of the sleeve 1. The connecting sheets 21 enclose a connecting hole 22, and the connecting sheets are provided with threads on sides close to an axial centerline of the connecting hole. The connecting hole 22 and the axial through hole 11 are aligned with a central axis. Optionally, the connecting sheets 21 are located on the same circumference to form a ring shape, and the connecting hole 22 enclosed by the connecting sheets 21 is a circular hole. As shown in FIG. 2, the two connecting sheets 21 are arranged oppositely and are in an arc shape respectively. A driving structure capable of driving each of the connecting sheets 21 to radially move toward the axial centerline of the connecting hole 22 when the connecting sheet 21 circumferentially rotates relative to the body 12 of the sleeve 1 is located between the connecting sheet 21 and the inner peripheral wall 121 of the body 12 of the sleeve 1, as shown in FIG. 7. That is, the connecting sheet 21 can circumferentially rotate relative to the body 12 of the sleeve 1, and the driving structure is disposed between the connecting sheet 21 and the inner peripheral wall 121 of the body 12. The driving structure drives the connecting sheet 21 to radially move towards the axial centerline of the connecting hole 22 when the connecting sheet 21 circumferentially rotates relative to the body 12 of the sleeve 1.

When the quick-connect device is installed, the sleeve 1 and the connecting piece 2 pass through a threaded pipe 6 to reach a predetermined position, and a mounting panel or other mounting components abut against the connecting sheets 21. The sleeve 1 is rotated, and the driving structure drives the connecting sheets 21 to radially move toward the axial centerline of the connecting hole 22 to narrow the connecting hole, thereby connecting the connecting sheets 21 to the threaded pipe 6 and quickly fixing the quick-connect device to the threaded pipe 6. Compared with prior art in which the connecting sheets 21 are connected to the threaded pipe 6 by transforming the axial movement into the radial movement of the connecting sheets, the present disclosure has the features that the connecting sheets 21 are driven directly by the driving structure to radially move toward the axial centerline of the connecting hole 22, without transforming the axial movement into the radial movement of the connecting sheets 21. Therefore, although at least two connecting sheets 21 are provided, it will not affect that the connecting sheets 21 radially move toward the axial centerline of the connecting hole 22 to be connected with the thread pipe 6 even if the mounting panel or other mounting components have an uneven phenomenon since the connecting sheets 21 do not move in an axial direction but only move in a radial direction. On the other hand, there is no clearance in the axis direction of the quick-connect device even if the threaded pipe loosens, which does not result in failure due to loosening of the internal structure of the quick-connect device. Thus, the present disclosure may be applied to uneven mounting panels, and meanwhile, is less prone to fixation failure due to loosening in the axial direction.

Optionally, the driving structure includes bulges 31 disposed on the inner peripheral wall 121 of the body 12 of the sleeve 1 in the axial direction, and inclined guide surfaces 32 disposed on the connecting sheets 21 in the circumferential direction. Each of the inclined guide surfaces 32 has a decreasing distance from the inner peripheral wall 121 of the body 12 of the sleeve 1 from a starting point to an ending point. The bulges 31 can relatively move in a circumferential direction on the inclined guide surfaces 32 to drive the connecting sheets 21 to radially move toward the axial centerline of the connecting hole 22. Specifically, when the sleeve 1 circumferentially rotates relative to the connecting sheets 21 (the connecting piece 2), the mounting plate or other mounting components abut against the connecting sheets 21 to achieve relative fixation, the bulges 31 move from the starting points to the ending points of the inclined guide surfaces 32 to push the connecting sheets 21 to radially move toward the axial centerline of the connecting hole 22, thereby narrowing the connecting hole 22 to connect the connecting sheets 21 to the threaded pipe 6.

Specifically, each of the connecting sheets 21 has a top surface 211, and an inner side surface 212 as well as an outer side surface 213 adjacent to the top surface 211, where the inner side surface 212 is provided with threads, and a recess 321 applied to limitation of each of the bulges 31 is disposed at the ending point of the inclined guide surface 32. When the sleeve 1 rotates in place, the bulge 31 clamped into the recess 321 of the inclined guide surface 32 and does not easily loosen, thereby acting as a retaining function, as shown in FIG. 7.

The top surface 211 of the connecting sheet 21 is provided with a friction pad 4, the friction pad 4 is preferably a rubber pad. Specifically, as shown in FIG. 2, the top surface 211 of the connecting sheet 21 is provided with an insert slot. The rubber pad is set to have a T-shaped cross section, and is inserted into the insert slot of the top surface 211, and a rib may be disposed an end surface of the rubber pad to increase friction between the rubber pad and the mounting panel or other mounting components. Of course, the rubber pad may be set to be in other shapes, for example, may be set to have a linear cross section. The rubber pad also plays the role of alleviating the influences caused by the uneven surface of mounting panel or other mounting components.

Figure 6:
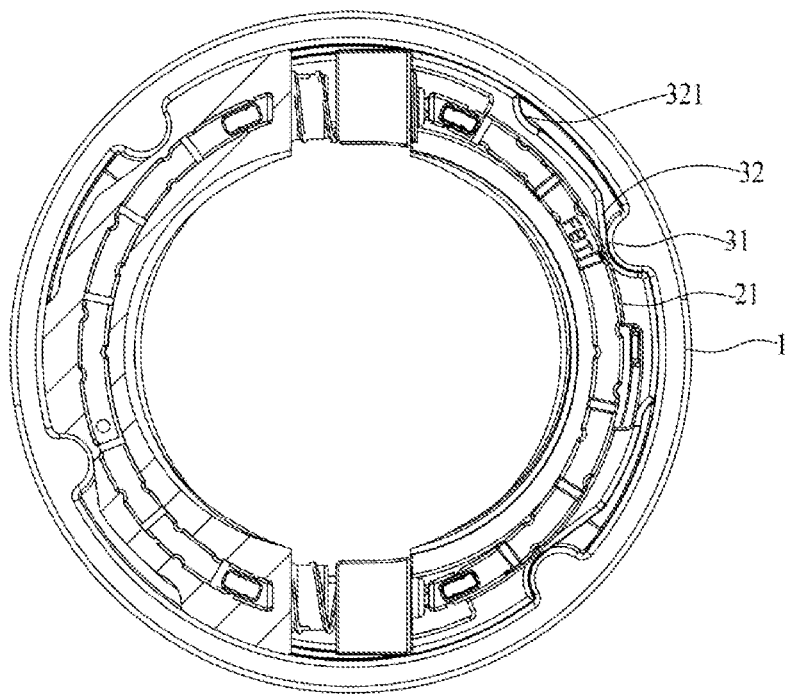
FIG. 6 is a transverse sectional view of Embodiment I of the present disclosure (connecting sheets being away from an axial centerline of a connecting hole)

Optionally, an elastic part 5 is connected between the adjacent connecting sheets 21. Preferably, the elastic part 5 is a plunger spring, and end parts of the connecting sheets 21 are provided with projections 214 in the circumferential direction, and one side of the plunger spring is clamped into the projection 214 of one connecting sheet 21, and the other side of the plunger spring is clamped into the projection 214 of the other connecting sheet 21. The elastic part 5 may be a spring plate, and preferably is a metal spring plate, or a non-metal spring plate that is integrally formed with the connecting sheet 21 and employs the same material as the connecting sheet 21. The elastic part 5 provides an elastic return force between the connecting sheets 21. When the bulge 31 moves from the starting point to the ending point of the inclined guide surface 32 to push the connecting sheet 21 to radially move toward the axial centerline of the connecting hole 22, the elastic part 5 is compressed to store energy. When the quick-connect device is disassembled, the bulge 31 returns from the ending point to the starting point of the inclined guide surface 32, such that the connecting sheet 21 is not squeezed. At this time, the connecting sheet 21 radially moves away from the axial centerline of the connecting hole 22 under the action of the elastic force of the elastic part 5, thereby enlarging the connecting hole 22, as shown in FIG. 6.

The end parts of the connecting sheets 21 are provided with retainers, and the retainers of the adjacent connecting sheets 21 are staggered up and down in a shielding manner, and can cover the elastic part 5.

Optionally, ribs 122 are disposed on the inner peripheral wall 121 of the body 12 of the sleeve 1 in the circumferential direction, and sliding slots 215 are formed in the connecting sheets 21 applied to sliding of the ribs 122 in the circumferential direction. When the sleeve 1 rotates, the ribs 122 slide in the sliding slots 215, so that the movement of the connecting sheets 21 in the axial direction can be restricted, thereby making the connecting sheets 21 only move in the radial direction. The inner peripheral wall 121 of the body 12 of the sleeve 1 is provided with a convex ring 123 in the circumferential direction to reduce the contact area between the connecting sheets 21 and the body 12 of the sleeve 1 and improve the hand feeling during rotation.

Embodiment II

Figure 9:
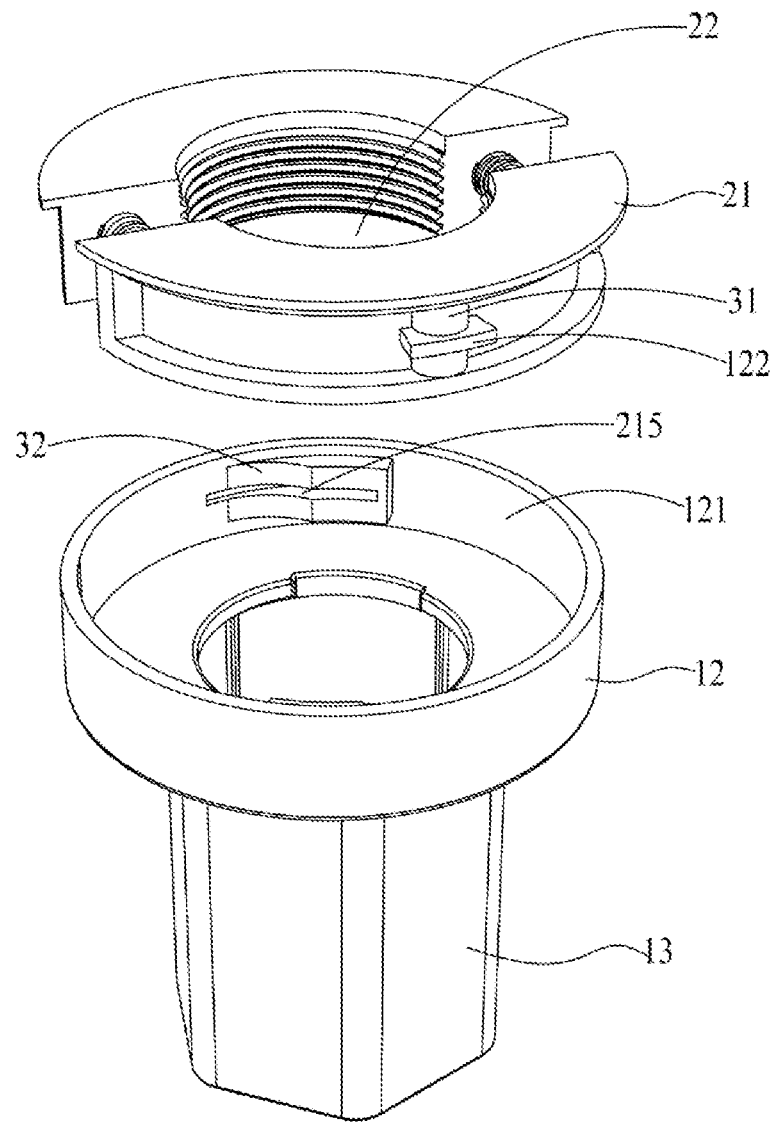
FIG. 9 is a stereoscopic exploded view of Embodiment II of the present disclosure.
Figure 10:
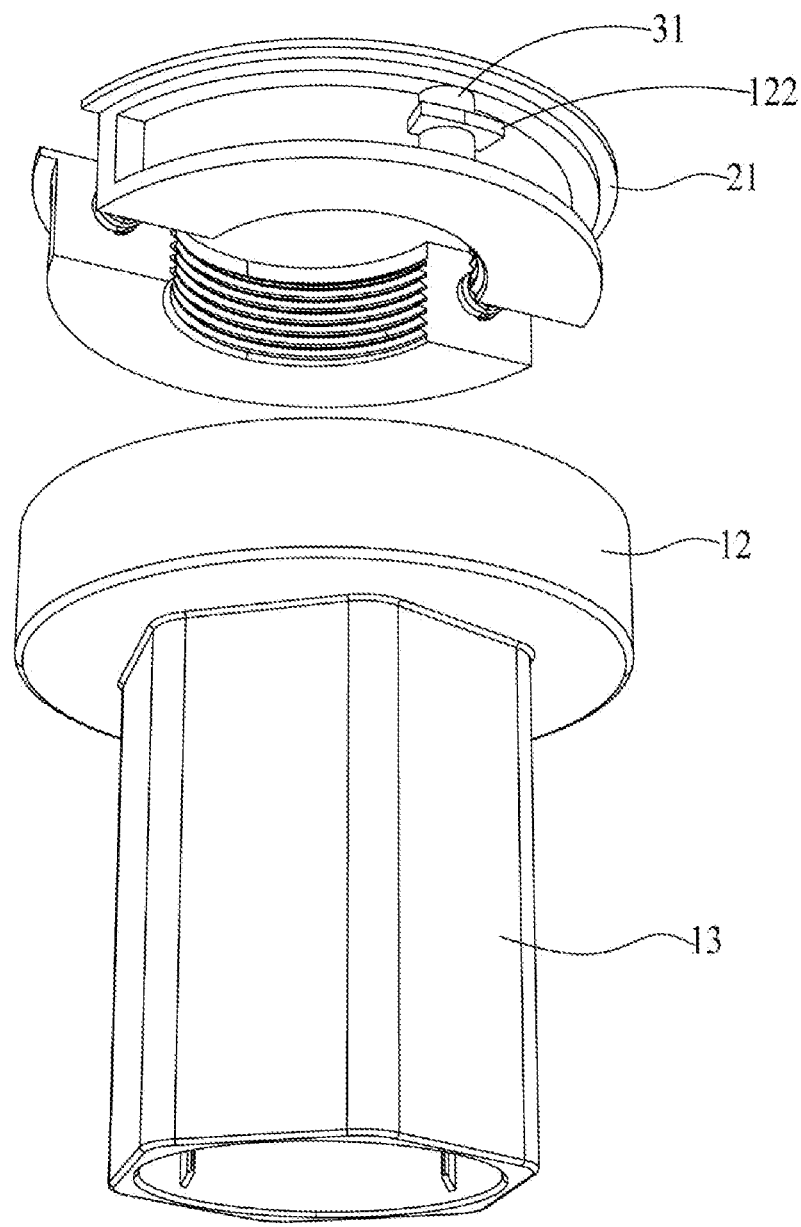
FIG. 10 is a stereoscopic exploded view of another angle of Embodiment II of the present disclosure.

The differences from Embodiment I lie in that, as shown in FIGS. 9 and 10, in Embodiment II, the driving structure includes inclined guide surfaces 32 disposed on the inner peripheral wall of the body 12 of the sleeve 1 in the circumferential direction, and bulges 31 disposed on the connecting sheets 21 in the axial direction. Specifically, each of the connecting sheets 21 has a top surface 211, and an inner side surface 212 as well as an outer side surface 213 adjacent to the top surface 211, where the inner side surface 212 is provided with threads, and the outer side surface 213 is provided with the bulge 31. Each of the inclined guide surfaces 32 has a decreasing distance from the connecting sheet 21 from a starting point to an ending point. The bulges 31 relatively move on the inclined guide surfaces 32 in the circumferential direction to drive the connecting sheets 21 to radially move toward the axial centerline of the connecting hole 22. Specifically, when the sleeve 1 circumferentially rotates relative to the connecting sheets 21 (the connecting piece 2), the mounting plate or other mounting components abut against the connecting sheets 21 to achieve relative fixation in general, the inclined guide surfaces 32 push the bulges 31 to make the connecting sheets 21 radially move toward the axial centerline of the connecting hole 22, so that the connecting hole 22 is narrowed to connect the connecting sheets 21 to the threaded pipe 6.

In embodiment II, ribs 122 are disposed on the outer side surfaces 213 of the connecting sheets 21 in the circumferential direction, and are disposed on the bulges 31. The inclined guide surfaces 32 are provided with sliding slots 215 applied to sliding of the ribs 122 in the circumferential direction. When the sleeve 1 rotates, the ribs 122 slide in the sliding slots 215, so that the movement of the connecting sheets 21 in the axial direction can be restricted, thereby making the connecting sheets 21 only move in the radial direction.

Embodiment III

Figure 11:
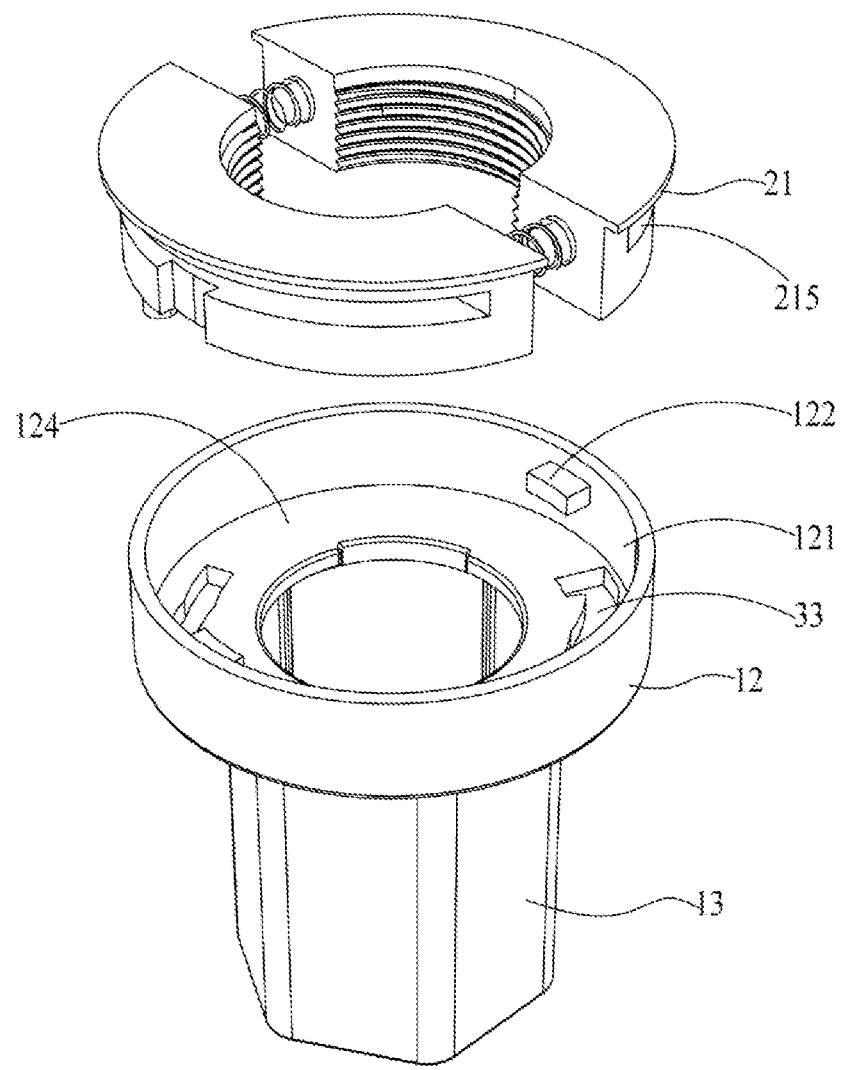
FIG. 11 is a stereoscopic exploded view of Embodiment III of the present disclosure.
Figure 12:
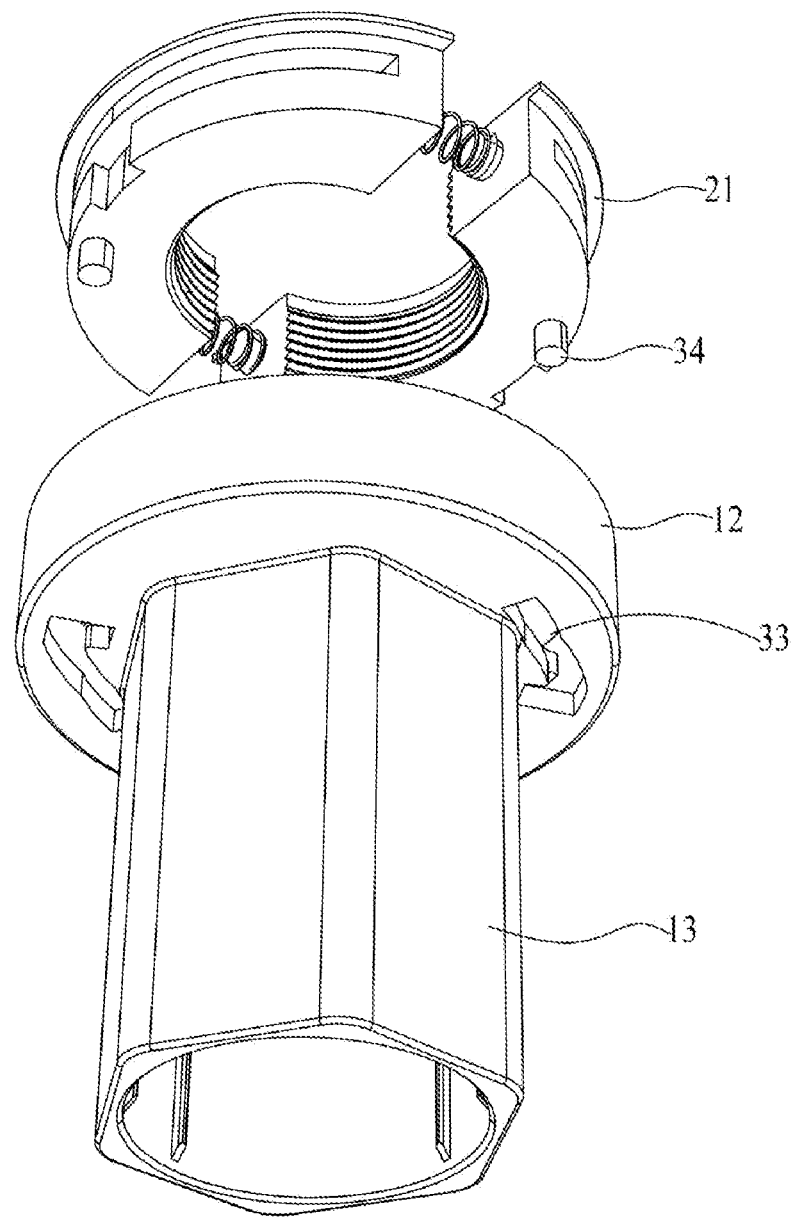
FIG. 12 is a stereoscopic exploded view of another angle of Embodiment II of the present disclosure.

The differences from Embodiment I lie in that, as shown in FIGS. 11 and 12, in Embodiment III, the driving structure includes inclined guide slots 33 that are disposed in a bottom wall 124, adjacent to the inner peripheral wall 121, of the body 12 of the sleeve 1 in the circumferential direction, and projections 34 that are disposed on the connecting sheets 21 in the axial direction. Specifically, each of the connecting sheets 21 has a top surface 211, a bottom surface 216 opposite to the top surface 211, and an inner side surface 212 adjacent to the top surface 211, where the inner side surface 212 is provided with the threads, and the bottom surface 216 is provided with the projections 34. Each of the inclined guide slots 33 has a decreasing distance from the inner peripheral wall 121 of the body 12 of the sleeve 1 from a starting point to an ending point. Specifically, when the sleeve 1 circumferentially rotates relative to the connecting sheets 21 (the connecting piece 2), the mounting plate or other mounting components abut against the connecting sheets 21 to achieve relative fixation in general, and the inclined guide slots 33 push the projections 34 to make the connecting sheets 21 radially move toward the axial centerline of the connecting hole 22, so that the connecting hole 22 is narrowed to connect the connecting sheets 21 to the threaded pipe 6.

Example IV

Figure 13:
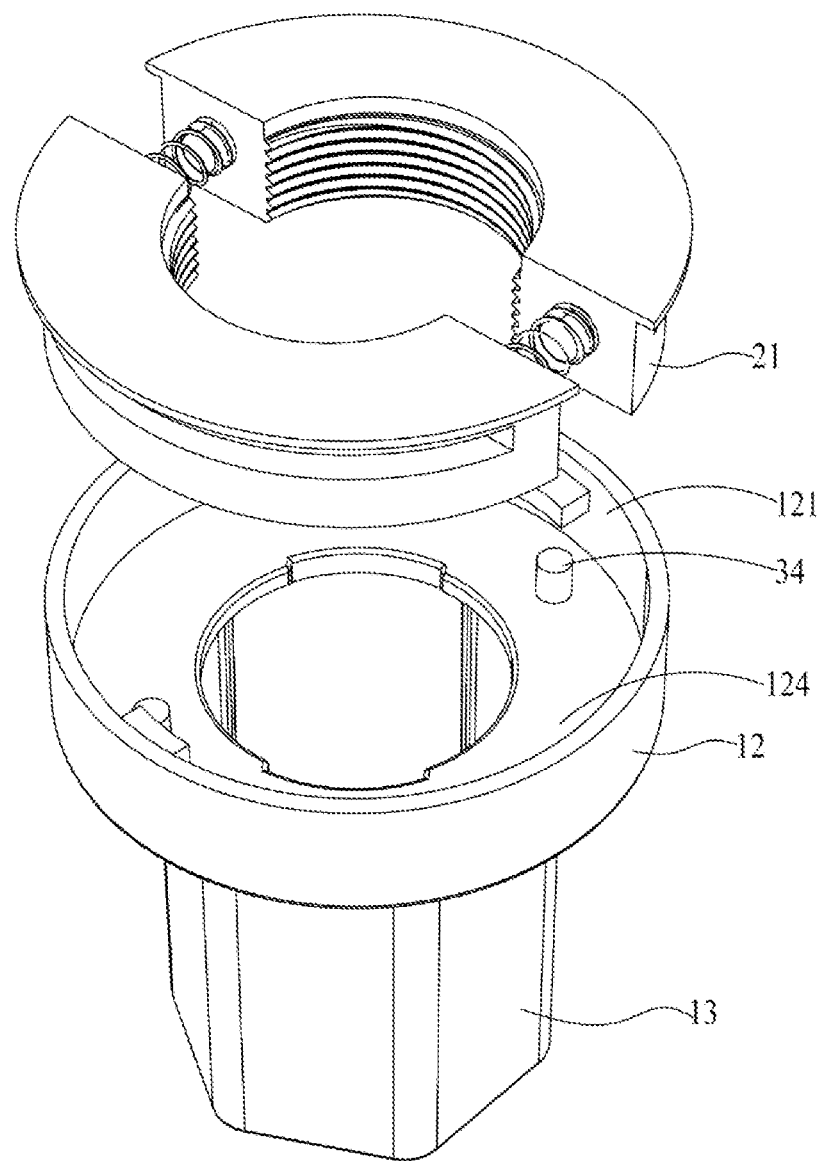
FIG. 13 is a stereoscopic exploded view of Embodiment IV of the present disclosure.
Figure 14:
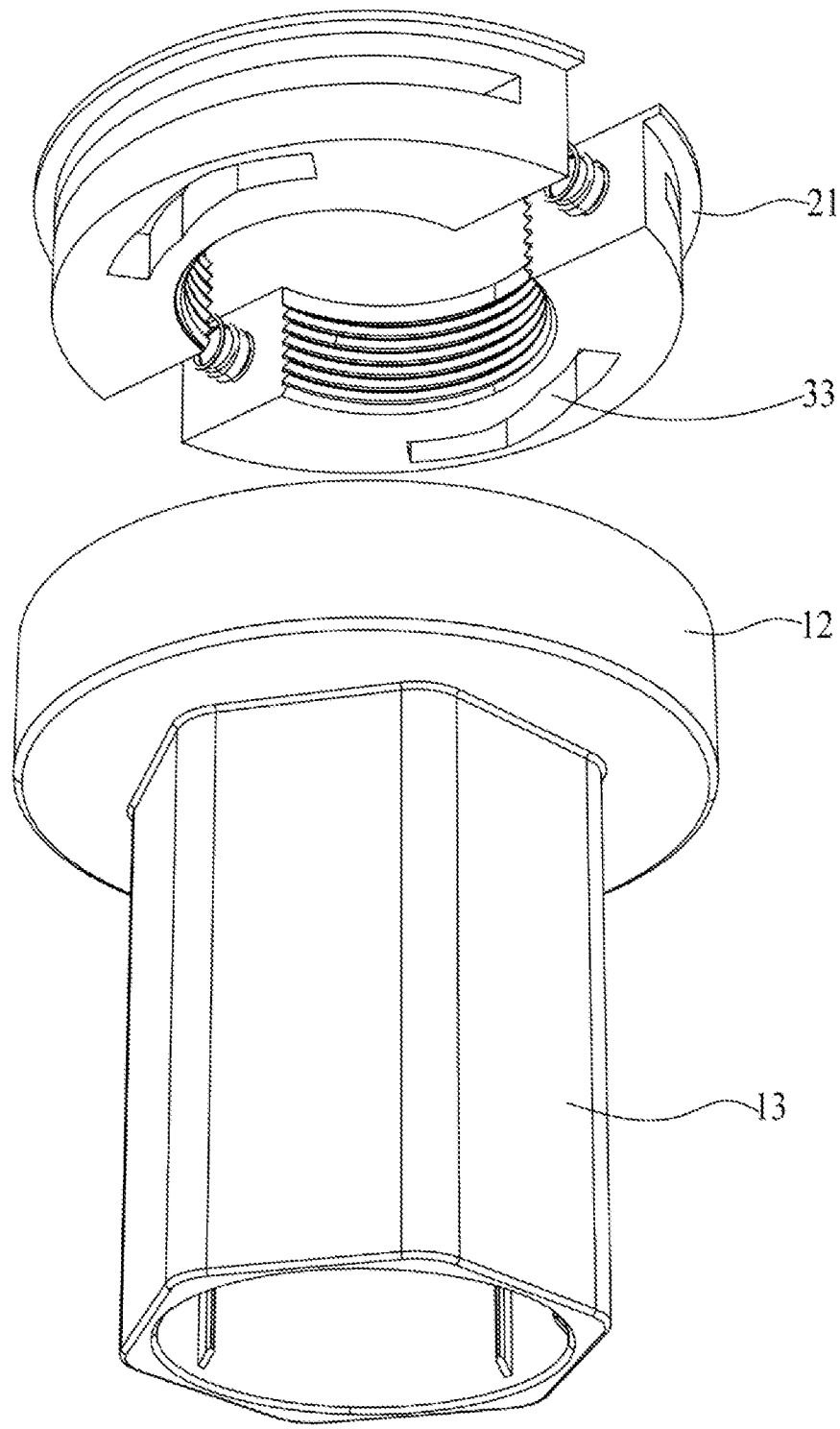
FIG. 14 is a stereoscopic exploded view of another angle of Embodiment IV of the present disclosure.

The differences from Embodiment I lie in that, as shown in FIGS. 13 and 14, in Embodiment IV, the driving structure includes projections 34 disposed on a bottom wall 124, adjacent to the inner peripheral wall 121, of the body 12 of the sleeve 1 in the axial direction, and inclined guide slots 33 disposed in the connecting sheets 21 in the circumferential direction. Specifically, each of the connecting sheets 21 has a top surface 211, a bottom surface 216 opposite to the top surface 211, and an inner side surface 212 adjacent to the top surface 211, where the inner side surface 212 is provided with threads, and the bottom surface 216 is provided with the inclined guide slot 33. When the projections 34 move relative to the inclined guide slots 33 in the circumferential direction, the connecting sheets 21 can radially move towards the axial centerline of the connecting hole 22.

Embodiment V

Figure 15:
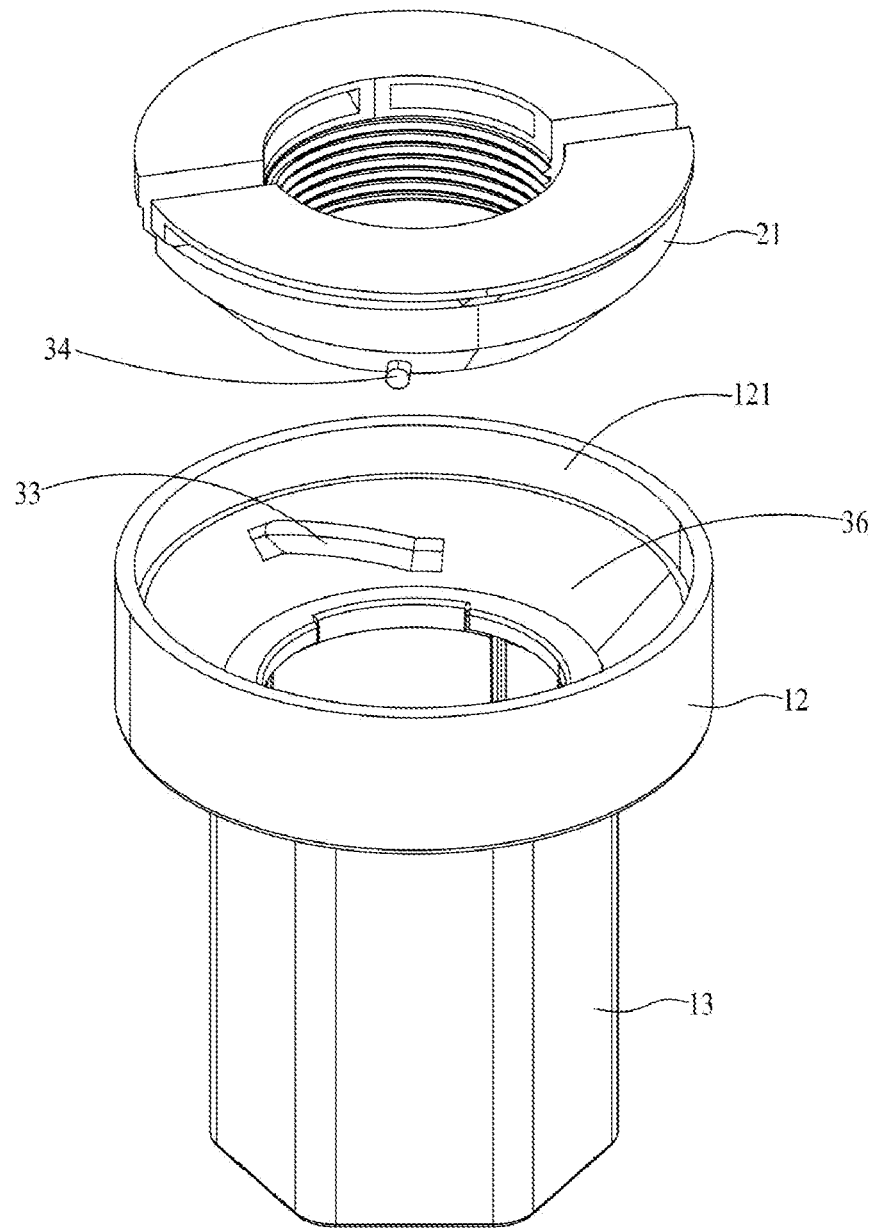
FIG. 15 is a stereoscopic exploded view of Embodiment IV of the present disclosure.
Figure 16:
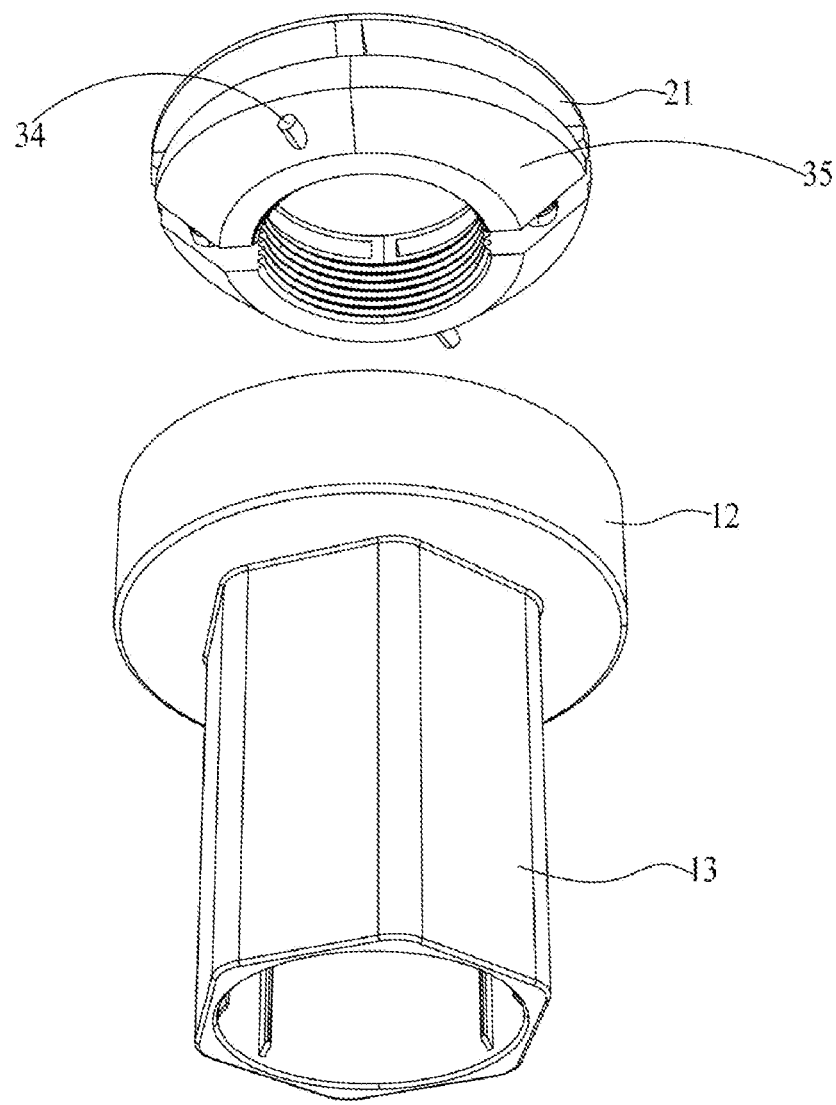
FIG. 16 is a stereoscopic exploded view of another angle of Embodiment IV of the present disclosure.

The differences from Embodiment I lie in that, as shown in FIGS. 15 and 16, in Embodiment V, the driving structure includes inclined guide slots 33 and projections 34. The connecting sheets 21 have top surfaces 211, and outer side surfaces 213 adjacent to the top surface 211, where the outer side surfaces 213 are provided with first inclined surfaces 35 on which the projections 34 are radially arranged. The inner peripheral wall 121 of the body 12 of the sleeve 1 is provided with second inclined surfaces 36 attached to the first inclined surfaces 35, and the second inclined surfaces 36 are provided with inclined guide slots 33 each of which has a decreasing distance from the inner peripheral wall 121 of the body 12 of the sleeve 1 from a starting point to an ending point, so that when the inclined guide slots 33 move relative to the projections 34 in the circumferential direction, the connecting sheets 21 are driven to radially move toward the axial centerline of the connecting hole 22.

In the description of the present disclosure, it should be understood that the terms "central", "longitudinal", "transverse", "length", "width", "thickness", "upper", "lower", "front", "rear", "left", "right", "vertical", "horizontal", "top", "bottom", "inner", "outer", "clockwise", "counterclockwise", and the like indicate an orientation or positional relationship based on the orientation or positional relationship shown in the drawings, and are merely for facilitating the description of the present disclosure and simplifying the description, rather than indicating or implying that the indicated device or element must have a specific orientation, or be constructed and operated in a specific orientation, and therefore should not be construed as limiting the present disclosure.

Furthermore, the terms "first" and "second" are used for descriptive purposes only and cannot be understood to indicate or imply relative importance or to implicitly specify the number of technical features indicated. Thus, features defined as "first" and "second" may explicitly or implicitly include one or more of such features. In the description of the present disclosure, "a plurality of" means two or more, unless expressly and specifically defined otherwise.

In the present disclosure, unless expressly stated and limited otherwise, the terms "install", "link", "connect", "fix" and the like should be understood broadly. For example, it may be fixed connection, may also be removable connection, or integral connection; it may be mechanical connection, or may also be electrical connection; and it may be direct connection, or may also be indirect connection through an intermediate medium, and may be internal connection of two elements or in an interactive relationship between two elements. Those of ordinary skill in the art may understand the specific meaning of the above terms in the present disclosure according to specific circumstances.

In the present disclosure, unless expressly stated and defined otherwise, a first feature being "on" or "below" a second feature may include that the first feature and the second feature are in direct contact or that the first feature and the second feature are not in direct contact but are in contact through another feature between them. Moreover, a first feature being "above," "over," and "on" a second feature includes that the first feature is right above and obliquely above the second feature, or simply indicates that the first feature is at a higher position than the second feature. A first feature being "below", "under", and "beneath" a second feature includes that the first feature is directly below and obliquely below the second feature, or simply indicates that the first feature is at a lower position than the second feature.

In the description in this specification, the description referring to "one embodiment", "some embodiments", "an example", "a specific example", "some examples" or the like means that specific features, structures, materials, or characteristics described in combination with the embodiment or example are included in at least one embodiment or example of the present disclosure. In this specification, the illustrative descriptions of the above terms should not be understood as necessarily referring to the same embodiment or example. Furthermore, the specific features, structures, materials, or characteristics described may be combined in a suitable manner in any one or more embodiments or examples. In addition, the different embodiments or examples described in this specification may be joined and combined by those skilled in the art.

Although the embodiments of the present disclosure have been shown and described above, it will be appreciated that the above embodiments are illustrative and not intended to limit the present disclosure. Those of ordinary skill in the art may make changes, modifications, substitutions, and variations to the above embodiments within the scope of the present disclosure.

What is claimed is:

1. A quick-connect device, comprising:
a sleeve, having an axial through hole, and comprising a body having an inner peripheral wall; and
a connecting piece, comprising at least two connecting sheets, wherein the connecting sheets can circumferentially rotatably disposed in the inner peripheral wall of the body relative to the body of the sleeve, the connecting sheets enclose a connecting hole, the connecting sheets are provided with threads on sides close to an axial centerline of the connecting hole, and a driving structure capable of driving each of the connecting sheets to radially move toward the axial centerline of the connecting hole when the connecting sheet circumferentially rotates relative to the sleeve is located between the connecting sheet and the inner peripheral wall of the body;
wherein the driving structure comprises a bulge disposed on the inner peripheral wall of the body of the sleeve in an axial direction and an inclined guide surface disposed on the connecting sheet in the circumferential direction, the inclined guide surface has a decreasing distance from the inner peripheral wall of the body of the sleeve from a starting point to an ending point, and the bulge can relatively move in the circumferential direction on the inclined guide surface to drive the connecting sheet to radially move toward the axial centerline of the connecting hole.

2. The quick-connect device of claim 1, wherein an elastic part is connected between the adjacent connecting sheets.

3. The quick-connect device of claim 2, wherein the elastic part is a plunger spring, end parts of the connecting sheets are provided with projections in a circumferential direction respectively, one side of the plunger spring is clamped into the projection of one of the connecting sheets, and the other side of the plunger spring is clamped into the projection of the other one of the connecting sheets.

4. The quick-connect device of claim 1, wherein the connecting sheet has a top surface, an inner side surface as well as an outer side surface adjacent to the top surface, the inner side surface is provided with the threads, and the outer side surface is provided with the inclined guide surface in the circumferential direction.

5. The quick-connect device of claim 4, wherein a friction pad is disposed on the top surface of the connecting sheet.

6. The quick-connect device of claim 1, wherein a recess applied to limiting the bulge is disposed at the ending point of the inclined guide surface.

7. The quick-connect device of claim 1, wherein ribs are disposed on the inner peripheral wall of the body of the sleeve in the circumferential direction, and sliding slots applied to sliding of the ribs are disposed in the connecting sheets in the circumferential direction.

8. The quick-connect device of claim 1, wherein a convex ring is disposed on the inner peripheral wall of the body of the sleeve in the circumferential direction.

9. The quick-connect device of claim 1, the sleeve further comprises a handheld part connected to a side opposite to the side, at which the connecting sheets are disposed, of the body.

10. The quick-connect device of claim 1, wherein the connecting sheets are located on the same circumference to form a ring shape, and the connecting hole enclosed by the connecting sheets is a circular hole.

* * * * *